No. 725,589. PATENTED APR. 14, 1903.
J. G. & M. O. REHFUSS.
CAN TESTING APPARATUS.
APPLICATION FILED JULY 26, 1902.
NO MODEL. 4 SHEETS—SHEET 1.

No. 725,589. PATENTED APR. 14, 1903.
J. G. & M. O. REHFUSS.
CAN TESTING APPARATUS.
APPLICATION FILED JULY 26, 1902.
NO MODEL. 4 SHEETS—SHEET 2.

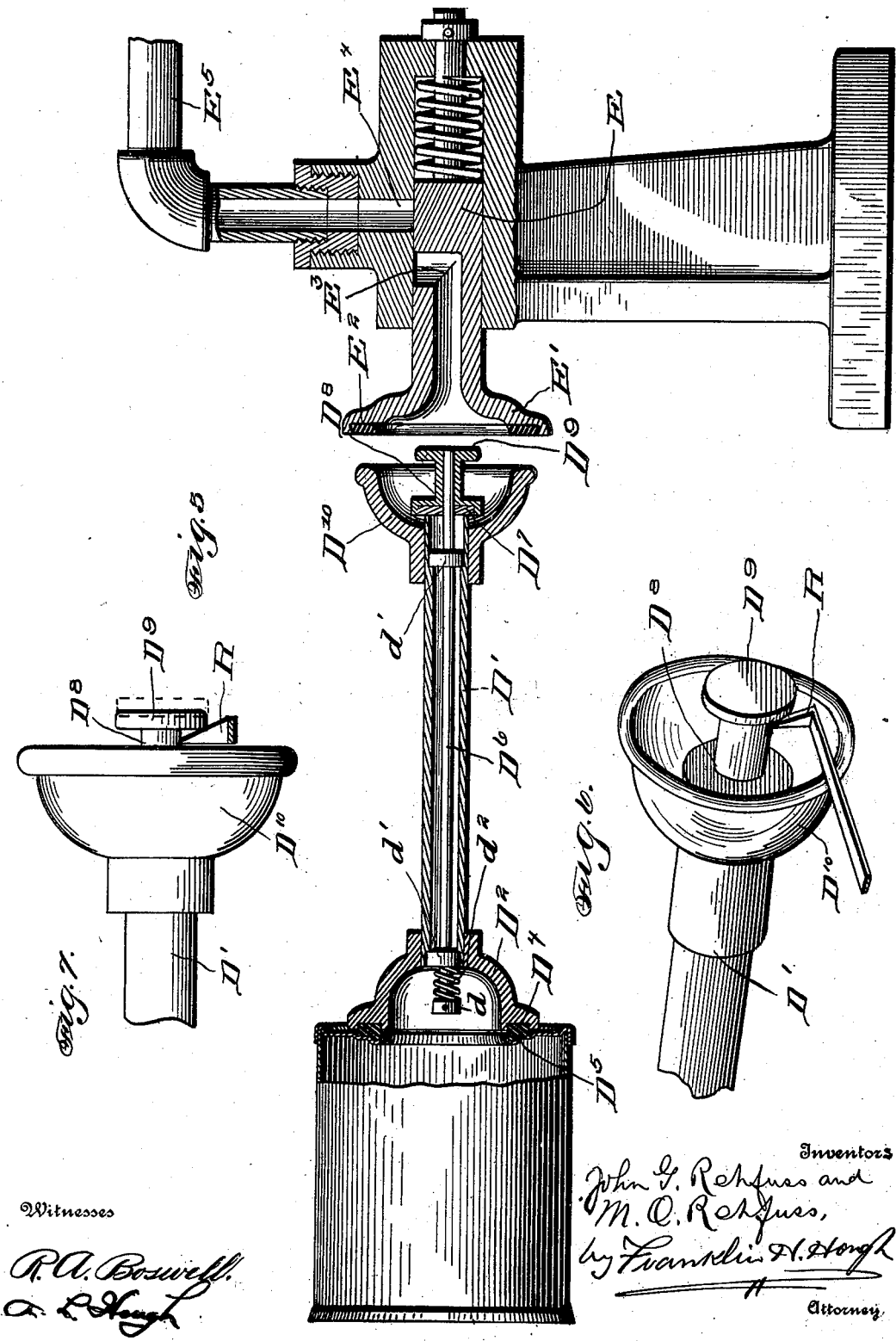

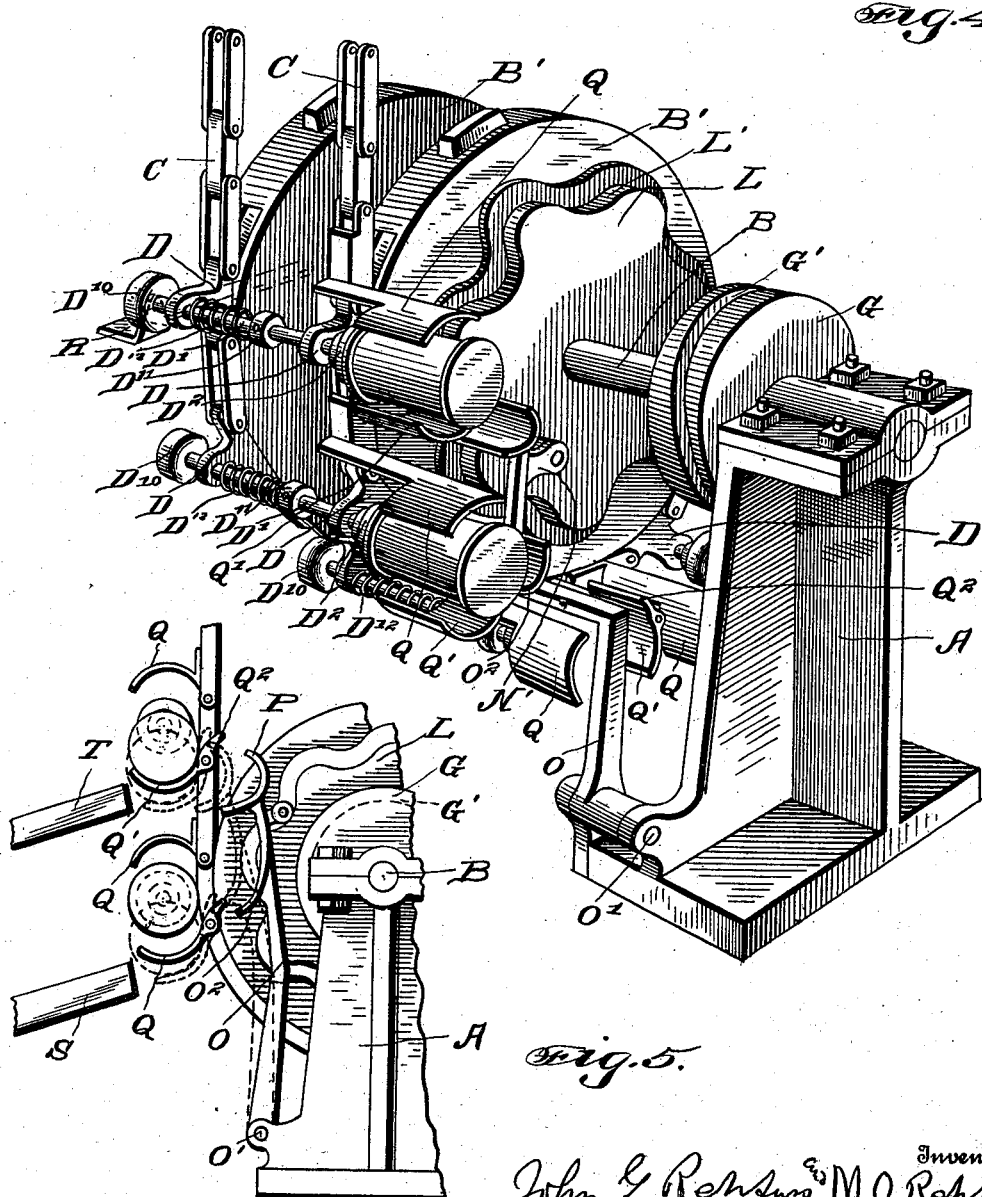

---

UNITED STATES PATENT OFFICE.

JOHN G. REHFUSS AND MARTIN O. REHFUSS, OF PHILADELPHIA, PENNSYLVANIA, ASSIGNORS TO BUREAU CAN AND MANUFACTURING COMPANY, OF DELAWARE.

CAN-TESTING APPARATUS.

SPECIFICATION forming part of Letters Patent No. 725,589, dated April 14, 1903.

Application filed July 26, 1902. Serial No. 117,173. (No model.)

*To all whom it may concern:*

Be it known that we, JOHN G. REHFUSS and MARTIN O. REHFUSS, citizens of the United States, residing at Philadelphia, in the county of Philadelphia and State of Pennsylvania, have invented certain new and useful Improvements in Can-Testing Machines; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in can-testing apparatus, and especially in the provision of means for determining whether or not a can leaks after having been soldered, and comprises mechanism for automatically applying a can to a suction-cup with which communication is had with a vacuum-chamber for exhausting the air in the can, the latter being adapted to be carried on an endless conveyer while held by suction, said can being adapted to drop from the cup in case any air is allowed to enter the can, thus indicating an imperfectly-soldered seam, while means are provided for automatically detaching a perfectly-soldered can from the carrier.

The present invention consists in various details of construction and combinations of parts, as will be hereinafter fully described and then specifically defined in the appended claims.

Our invention is clearly illustrated in the accompanying drawings, which, with the letters of reference marked thereon, form a part of this application, and in which drawings similar letters of reference indicate like parts in the various views, in which—

Figure 1:
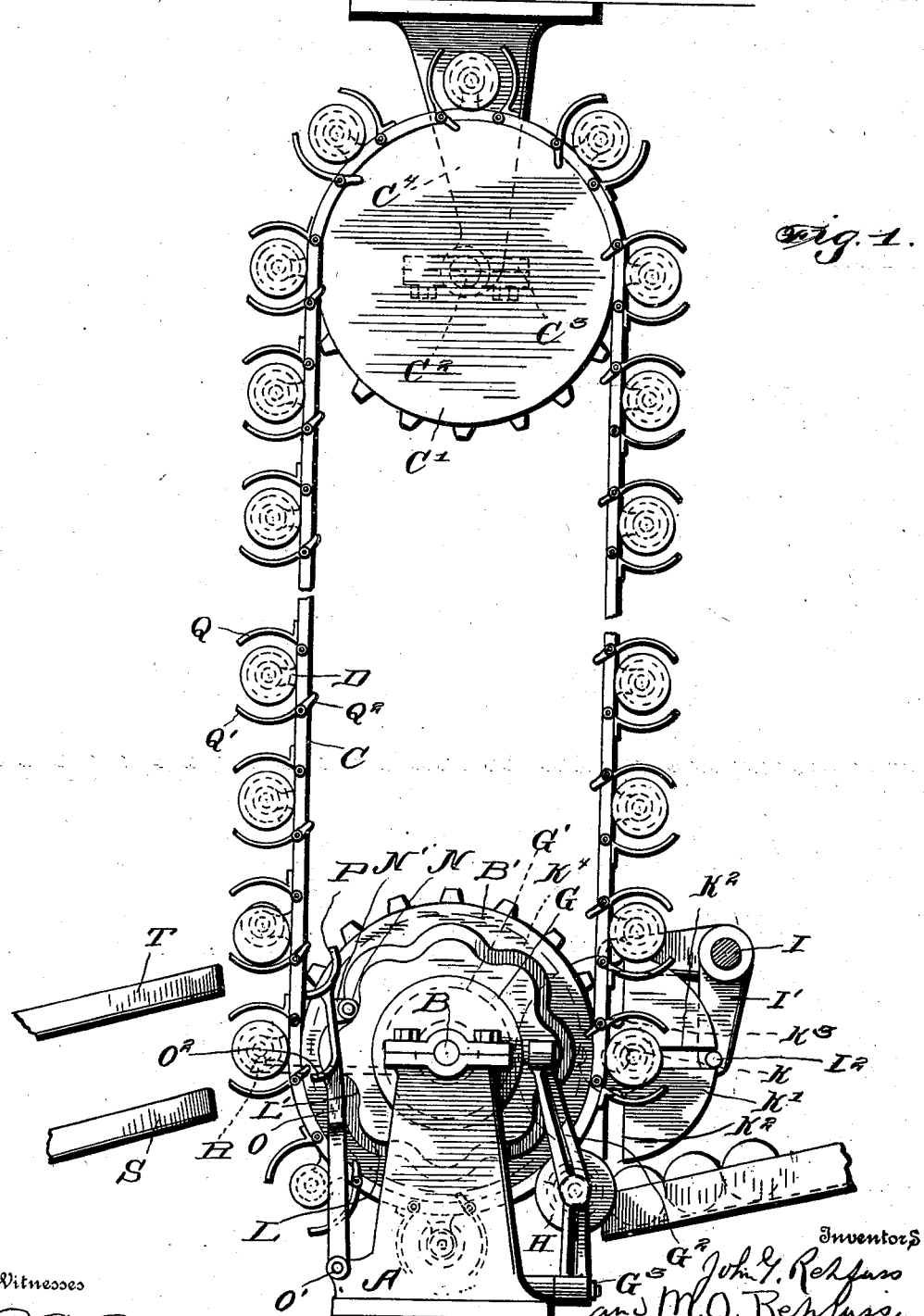
Figure 2:
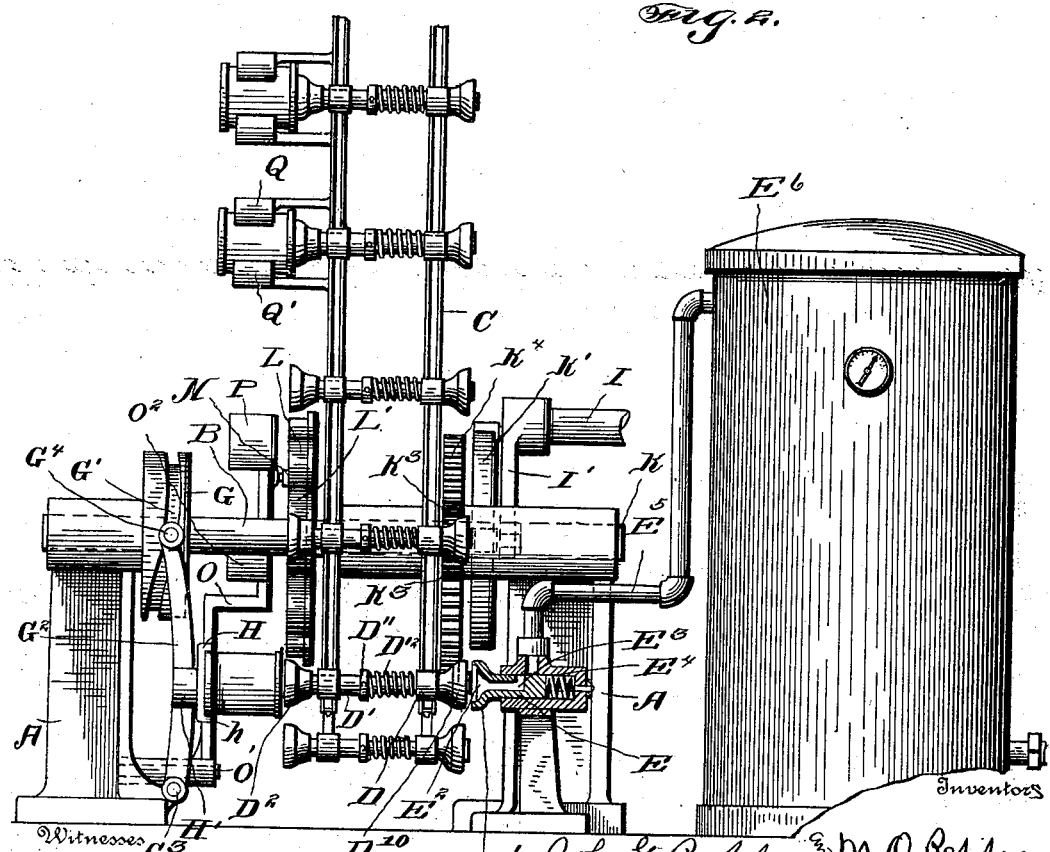

Figure 1 is a side elevation of our improved testing apparatus, the endless carrier being broken away and showing the sprocket-wheel over which the carrier travels. Fig. 2 is a side elevation of the construction illustrated in Fig. 1, the carrier being broken away in a similar manner as illustrated in Fig. 1, parts being shown in vertical section. Fig. 3 is a longitudinal sectional view through a testing member or suction-cup with valve and stem connections therewith, showing a can held to the suction-cup. Fig. 4 is an enlarged detail view of the mechanism employed for breaking the vacuum which holds a perfectly-soldered can to the carrier, allowing the can to be discharged from the carrier. Fig. 5 is a detail view showing the means for tilting one of the pockets or shelves adapted to receive a can as it falls from a suction-cup. Figs. 6 and 7 are detail views.

Reference now being had to the details of the drawings by letter, A A designate standards in which a shaft B is journaled in suitable bearings, and keyed to said shaft is a sprocket-wheel B', about which an endless-chain carrier C travels, which carrier passes over a second sprocket-wheel C', which is keyed to rotate with shaft $C^2$, mounted in suitable bearings $C^3$, carried by the hangers $C^4$, which latter are adapted to be fastened to any stationary member, as to the ceiling of a room. Each of the links of said chain is provided with arms D, and each link, which carries two of said arms, has mounted therein a testing member comprising a hollow tubular portion D', having a suction-cup $D^2$ fastened to one end and having communication with said hollow tubular portion. Said suction-cup $D^2$ has preferably an annular recess in its flaring face, as illustrated by $D^4$ in Fig. 3 of the drawings, said annular recess having a cushion $D^5$ seated therein, which is adapted to contact with the end of a can about the filling-aperture in the head thereof when a can is forced against said cushion. Mounted in the ends of said tubular portion are perforated partitions d', which are centrally apertured to receive a spring-actuated piston-stem $D^6$, which piston-stem has a collar $d$ at one end keyed or otherwise fastened thereto, and interposed between said collar $d$ and the adjacent perforated partition $d'$ is a coiled spring $d^2$, which is adapted to normally hold the piston-stem in the position shown in solid lines in the drawings. The other end of the piston-stem carries a flexible valve $D^7$, which is adapted to be held by said spring in contact with the end of the tubular portion of the testing member. Said flexible valve D⁷ is preferably seated in a recessed head D⁸, having a flanged end D⁹, as shown, which latter portion extends outside of a cup D¹⁰, which is fastened to the circumference of the tubular portion of the testing member, as shown. Keyed to each tubular portion D' is a collar D¹¹, intermediate which and an arm D, carried by the link, is disposed a spring D¹², which is provided for the purpose of holding the testing member, having a suction-cup mounted on the end thereof in the position shown in Fig. 2 of the drawings and in a proper position to receive a can, which is automatically forced against a cushion mounted in the recess in the suction-cup.

Mounted in a suitable standard forming a portion of the frame of the machine is a spring-actuated member E, which has a cup E' upon one end thereof, the flaring portion of which cup has an annular shoulder, in which is seated a flexible cushion E², which is adapted to form a close connection between the cup D¹⁰ when the two come together under pressure, as will be understood. A spring is interposed between the inner end of the shank portion of said member E and the end wall of a boxing in which said member has a reciprocating movement, and a bore or duct E³ leads from said cup E' and opens through an aperture in the circumference of said member E near its inner end, said duct or bore being adapted to register with a duct E⁴, leading from the boxing or casing in which the shank portion E has a reciprocating movement, when said cup E' is forced inward against the tension of said spring. Said duct E⁴ communicates through a pipe E⁵ with a vacuum-tank E⁶, from which the air may be exhausted by any suitable means. (Not shown.)

Mounted to rotate with the shaft B is a wheel G, having a cam-groove G' in the circumference thereof, and G² designates an oscillating lever, which is pivoted at one end on a pin G³ and carries a plate H, having a stud H', which is suitably mounted in an aperture in said lever. One face of said plate H is provided with a flange h, adapted to receive the flanged end of a can, which is fed against the same in any suitable manner from a can-making machine. The upper end of the lever G² carries an antifriction-roller G⁴, which is adapted to travel in said cam-groove G', as shown clearly in Fig. 2 of the drawings.

Mounted on the main operating-shaft I is an angle-lever I', each end of which lever carries an antifriction roller or wheel I². In the drawings I have shown said lever made with the arms thereon substantially at right angles to each other, and mounted on a shaft K is a wheel K', having four radial slots K² equidistant and of such a width as to receive the antifriction-wheels I², carried at the ends of the arms I'. Keyed to the shaft K is a gear-wheel K³, which is in mesh with a gear-wheel K⁴, which is keyed to rotate with the shaft B and the sprocket-wheel which rotates therewith. By the provision of the slotted wheel K', which is actuated by means of the antifriction-wheels carried by said angle-lever, it will be noted that an intermittent movement is imparted to the endless carrier for a purpose which will hereinafter appear.

Keyed to the shaft B is a cam-wheel L, having an undulating cam-groove L', as illustrated, in which an antifriction-wheel N, which is journaled on an arm N' integral with the pivoted lever O, travels. Said lever O is pivotally mounted on a pin O', carried on the standard of the machine, and at the free end of said lever is formed a concaved finger P. Fastened to each link are two pockets or shelves Q and Q', the former of which are rigidly held to the link, while each of said pockets or shelves Q' has a tilting movement. Projecting from each of the pivotal portions of the tilting pockets is a lug Q², projecting at an angle from the inner margin of the carrier, and the upper portion of the finger upon the lever O is adapted to contact with each of said lugs as a link carrying one of said lugs comes opposite the upper end of the lever O and as the finger P is thrown away from the cam-wheel L, said lever being thrown by means of the antifriction-wheel N, which travels about the cam-surface thereof. Said pockets, both the stationary and the pivotal ones, are provided for the purpose of catching a can should the same be found to contain a leak, whether the can should happen to fall from the suction-cup when being elevated upon one side of the carrier or being carried down on the opposite side.

Mounted upon a stationary portion of the frame is an arm R, the end of which is adapted to project into the path of the flanged end D⁹ of the head D⁸, whereby as each testing member passes said arm R the inclined edge of the latter is adapted to contact with the inner face of the flange D⁹ and unseat the cushion or valve D⁷ sufficiently to allow the vacuum in the can which is held by the suction-cup to break, which will cause the can thus held to a suction-cup to fall by gravity therefrom. An arm O² is formed on the lever O at a position intermediate the free end of said lever and its pivotal portion and is adapted to contact with a can which has been released from the suction-cup by breaking the vacuum therein and is designed to push the can away from the carrier and into a chute S, which may be set at an inclination and adapted to carry away the can from the testing apparatus. Immediately above the chute into which the cans which have stood the test are deposited is a chute T, into which the imperfect cans or those which have been found to contain leaks are deposited by means of the finger P at the upper end of said lever O.

The operation of our can-testing apparatus is as follows: The cans to which the tops and bottoms have been attached are fed by any suitable means to locations in which the cans singly contact with the flanged plate H. As the cam-wheel G rotates a lever G², having an antifriction-wheel traveling in the groove of the circumference thereof, is caused to oscillate, which will throw the can against the cushion held in the annular recess in the suction-cup, and said lever G², forcing the can under pressure against the suction-cup, will cause the latter to yield, and the tubular portion thereof will move longitudinally under tension of the spring D¹² and the cup D¹⁰ will come into close air-tight contact with the cup E' and pushing upon the latter will cause the duct in the shank portion thereof to register with the duct E⁴, which communicates with the vacuum-chamber. Our mechanism is so adjusted that at the moment the lever G² forces the suction-cup longitudinally, so that the ducts E³ and E⁴ will register, the endless carrier and the operative parts of our apparatus are momentarily at rest. The interval of rest, which may amount to a small fractional part of a second, is sufficient for a vacuum to be formed in the can, which is held against the cushion upon the suction-cup. This intermittent movement is provided for through the medium of the angle-lever I', which has antifriction-wheels mounted at the ends thereof, which are adapted to register in two of the slots of the wheel K', thus imparting a one-half revolution thereto, after which there is a pause in the operation of the machine until the shaft carrying the angle-wheel makes a one-half revolution to bring the antifriction-rollers carried thereby into the succeeding slots of the wheel. The movements of the various parts of our apparatus are so predetermined that at the instant the vacuum is formed in the can the machine is put in operation. After a vacuum has been formed in a can the plate H will be thrown from the can on the outward throw of the lever G², connection between the two cups D¹⁰ and E' will be broken by means of the coiled spring D¹², and the cushion or valve mounted on the stem, which has a spring-actuated reciprocating movement in the tubular portion of the testing member, will seat, thus retaining the vacuum in the can, and the can will be carried clinging to the suction-cup as the carrier makes a rotation. By the provision of the pockets or shelves one mounted on each side of a testing member or suction-cup provision is had for catching a can should it happen to drop from the suction-cup by reason of the vacuum breaking should there be a leak in the can. By conveying the can thus held to a suitable distance up one side of the carrier and down the other a sufficient time is provided for the vacuum in the can to break if there should be a minute aperture in the can. On the downward travel of the cans they are carried over by the suction-cup, or in case of there being a defective or leaky can and the same dropping from the cup upon the shelf underneath the same, when the lugs Q² on the pivoted pockets reach a location opposite the upper end of the lever O, the latter is thrown away from the cam-wheel L, and the upper portion of the finger P is presented in the path of the lug, and the latter striking said finger will tilt the pocket and the impact of the finger against the link will throw the defective can in which the leak has been discovered into the trough T. A perfectly-soldered can which has been thoroughly tested and no leak found therein will continue traveling with the suction-cup until the flanged end D⁹, which forms a part of the stem D⁶, comes into contact with the inclined end of the stationary arm R, and at which moment the valve or cushion D⁷ will be thrown away from its seat, allowing air to enter the tubular portion of the testing member and the suction-cup carried thereby, thus causing the vacuum to instantly break, and simultaneously with this movement the arm O² will strike the body of the can and force the same away from the carrier into the trough or chute S.

While we have illustrated means for imparting an intermittent movement to the mechanism by the provision of the angle-lever with two arms having antifriction-rollers for giving the wheel with slots therein a one-half revolution, it will be understood that if desired to vary the movements an additional arm or arms may be provided for securing any variations in the intervals at which the machine is at rest, and it will also be understood that various other modifications may be made in our machine without departing from the spirit of the invention.

Having thus fully described our invention, what we claim as new, and desire to secure by Letters Patent, is—

1. A can-testing machine comprising an endless carrier, suction-cups mounted on said carrier and adapted to have a longitudinal movement thereon, means for forcing cans against said cups and throwing the same into communication with a vacuum-tank, and means for breaking connection with said tank, after the air has been exhausted from the can, as set forth.

2. A can-testing machine comprising an endless-chain carrier, suction-cups having hollow spring-actuated shank portions mounted on said carrier, an oscillating arm, and means for operating the same whereby said arm will throw a can against said suction-cup and move the cup into communication with a vacuum-tank, as set forth.

3. A can-testing machine comprising an endless carrier, suction-cups having hollow spring-actuated shank portions mounted on said carrier and having a longitudinal movement, a vacuum-tank, a spring-actuated cup having a hollow shank portion adapted to be thrown into communication with a passageway leading to said tank, an oscillating arm, and means for operating the same whereby a can is forced against said suction-cup and adapted to move the latter so as to open communication with the vacuum-tank, as set forth.

4. A can-testing machine comprising an endless carrier, suction-cups carried thereby and having hollow shank portions which are spring-actuated, a vacuum-tank, means for imparting an intermittent movement to the carrier, and means for forcing a can against a suction-cup and opening communication with the vacuum-tank while the carrier is at rest, as set forth.

5. A can-testing machine comprising an endless carrier having an intermittent movement and means for operating the same, suction-cups having hollow spring-actuated shank portions mounted thereon, an oscillating arm, and means for operating the same, whereby a can is pushed by said arm against the suction-cup and imparts a longitudinal movement to the shank portion of said cup to open communication with the vacuum-tank while the carrier is at rest, as set forth.

6. A can-testing machine comprising an endless carrier having an intermittent movement and means for operating the same, suction-cups having hollow spring-actuated shank portions mounted thereon, an oscillating arm adapted to force a can against said cup and impart a longitudinal movement to the shank portion of the suction-cup, whereby communication is had between the can and a vacuum-tank, while the carrier is at rest, and means for cutting off communication with the vacuum-tank as the carrier starts, as set forth.

7. A can-testing machine comprising an endless carrier, suction-cups having hollow spring-actuated shank portions carried by said carrier, a vacuum-tank, an oscillating arm, a plate carried thereby and adapted to contact with the end of a can to force the latter against said cup and move the shank portion of the cup longitudinally, whereby communication may be had between the can and the vacuum-tank, and means for cutting off communication with the vacuum-tank after the air has been exhausted from the can, as set forth.

8. A can-testing machine comprising an endless carrier, suction-cups mounted thereon and having hollow spring-actuated shank portions, a vacuum-tank, an oscillating arm, an antifriction-roller carried thereby, a cam-grooved wheel in which said roller is mounted, a flanged plate having a stud mounted in said arm, and adapted to contact with a can to force the same against said cup and impart a longitudinal movement to the shank portion thereof, whereby communication may be had with said vacuum-tank for the purpose of exhausting the air in the can, as set forth.

9. A can-testing machine comprising an endless carrier, suction-cups having spring-actuated hollow shank portions mounted thereon, a wheel having radial slots, an angle-lever, a shaft on which the same is mounted, antifriction-rollers carried by the arms of said lever and adapted to engage said slots to impart an intermittent rotary movement to said wheel, and geared connections between the latter and the endless carrier, an oscillating arm for throwing a can against the suction-cup and actuating the shank portion thereof longitudinally, whereby communication is had with the vacuum-tank when the carrier is at rest, as set forth.

10. A can-testing machine having an endless carrier, suction-cups having hollow shank portions mounted to have a longitudinal movement on said carrier, a spring-actuated valve-stem mounted within the shank portion of each suction-cup, a valve secured to said stem and adapted to be seated against one end of said shank portion, a flanged cup secured to said shank portion and about said valve, a vacuum-tank, a spring-actuated cup mounted upon a standard and having a duct adapted to register with the duct in the passage-way leading to said vacuum-tank, and an oscillating arm for forcing a can against the suction-cup, and actuating the shank portion of the latter to afford communication with said vacuum-tank, as set forth.

11. A can-testing machine comprising an endless-chain carrier, suction-cups carried thereby, an oscillating arm for forcing a can against said cup and means for exhausting the air from the can, and means for breaking the vacuum formed within the can, as set forth.

12. A can-testing machine comprising an endless carrier, suction-cups carried thereby and having hollow shank portions, a spring-actuated valve mounted in the shank portion of each of said cups, a stationary member which is adapted to contact with and actuate the stem of said valve, whereby the vacuum formed in the can is broken, as set forth.

13. A can-testing machine, comprising an endless carrier, suction-cups having spring-actuated shank portions mounted to have a longitudinal movement thereon, a spring-actuated valve-stem mounted in each of said shank portions, a valve secured to each stem and adapted to seat against the end of the shank portion of the suction-cup, a flanged head on said stem, means for forcing a can against said suction-cup and actuating the same to afford communication between the same and the suction-cup whereby air is exhausted from the can, a stationary member disposed in the path of the flange of said head and adapted to unseat said valve to allow the vacuum formed within the can to break, as set forth.

14. A can-testing machine comprising an endless-chain carrier, suction-cups having hollow spring-actuated shank portions mounted thereon, an oscillating lever for forcing a can against said suction-cup and imparting a longitudinal movement to the shank portion thereof, whereby communication is had with a vacuum-tank for exhausting the air in the can, a spring-actuated stem mounted in each shank portion of the suction-cup, a valve mounted on said stem and adapted to seat against the end of the shank portion of the suction-cup, a flanged head mounted on said stem, a stationary plate disposed in the path of said flanged head and adapted to unseat said valve for breaking the vacuum in the can, and an oscillating arm for throwing the can from the carrier after the vacuum is broken, as set forth.

15. A can-testing machine comprising an endless carrier, suction-cups having hollow spring-actuated shank portions mounted thereon, an oscillating arm for forcing a can against said cup and imparting a longitudinal movement to the shank portion thereof, whereby communication is had with a vacuum-tank for exhausting the air in the can, pivotal shelves carried by the carrier, an oscillating lever, and means for throwing the same so that a portion of said lever will tilt a shelf and discharge a can from the carrier, as set forth.

16. A can-testing machine comprising an endless carrier, suction-cups mounted thereon, means for forcing a can against said suction-cup, and exhausting the air therefrom, pivotal shelves carried by said carrier, each having a projecting lug, an oscillating lever having a curved finger at its free end which is adapted to be thrown into the path of said lug at a predetermined moment and cause the shelf to tilt, and to contact with the carrier and discharge the can by impact with the carrier, as set forth.

17. A can-testing machine comprising an endless carrier, suction-cups mounted thereon and means for forcing a can against a suction-cup and exhausting the air therefrom, pivotal curved shelves carried by the carrier, a lug connected to each of said shelves, a pivotal arm, an antifriction-wheel carried thereby, a grooved cam in which said antifriction-roller travels, a finger on said arm adapted to be thrown in the path of said lugs, whereby a shelf is tilted and a can discharged from the carrier, as set forth.

18. A can-testing machine comprising an endless-chain carrier, suction-cups carried thereby and means for forcing cans against said cups and exhausting the air therefrom, an oscillating lever having two arms, an antifriction-roller carried by said lever, a grooved cam in which said roller travels, and means for actuating said grooved cam, whereby said lever is thrown forward at a predetermined moment to discharge cans from the carrier, as set forth.

19. A suction-cup having a hollow shank portion, a cushion seated in the flanged portion of the cup, a spring-actuated stem mounted in said shank portion, and a cup at the opposite end, a valve mounted on said stem and adapted to seat against the end of the shank portion, a head on said stem having a flange at its end, and a recessed portion in which said valve is seated, as set forth.

In testimony whereof we hereunto affix our signatures in presence of two witnesses.

JOHN G. REHFUSS.
MARTIN O. REHFUSS.

Witnesses:
J. B. JARDELLA,
SAMUEL A. BAVIS.